2,909,562

PURIFICATION OF PLASTICIZER ESTERS

Vincent L. Hughes, Clark Township, Union County, Isidor Kirshenbaum, Westfield, and Alan A. Schetelich, Cranford, N.J., assignors to Esso Research and Engineering Company, a corporation of Delaware No Drawing. Application February 8, 1957
Serial No. 638,900

9 Claims. (Cl. 260—475)

This invention relates to the stabilization of alcohols contaminated with carbonyl and/or carbonyl-forming compounds by the use of certain additives whereby plasticizer esters having improved color properties may be obtained. Still more specifically, this invention relates to the use of certain amide compounds, especially lower alkyl amides, as additives for contaminated alcohol products to prevent color formation in plasticizer esters prepared therefrom. This invention also relates to the preparation of plasticizers in the presence of amide additives.

The ever expanding use of plastic materials such as vinyl chloride polymers or copolymers, polyvinyl acetate, cellulose esters, acrylate and methacrylate resins, rubbers such as the emulsion copolymers of butadiene and styrene or acrylonitrile, or the copolymers of isobutylene with small amounts of a diolefin such as isoprene, has created a large demand for suitable plasticizers. Branched chain alkyl organic esters and particularly alkyl phthalic acid esters and more particularly octyl and decyl phthalate, as well as the esters of maleic acid, adipic acid, azelaic acid, sebacic acid or their anhydrides, have been known to be extremely satisfactory plasticizers for the aforementioned high molecular weight materials. For the esterification acid reacting compounds having two acid radicals such as dicarboxylic acids and/or their anhydrides are suitable reactants with the desired alcohol.

These plasticizer esters are generally prepared by the esterification of a suitable alcohol, e.g. $C_6$—$C_{14}$ alcohol, with an acidic reactant such as phthalic acid, the anhydride thereof or any of the acidic reactants noted above. In general, the alcohol is employed in amounts from stoichiometric to substantial excesses and heated, preferably in the presence of an acid catalyst such as benzene sulfonic acid, toluene sulfonic acid, naphthalene sulfonic acid or the like. Entrainers or azeotrope formers may be employed during the reaction to effect the removal of water at lower temperatures since it is known that severe operating conditions, including high temperatures and strongly acidic catalysts, tend to magnify any discoloration which may result from contaminants in the alcohol reactant. Entrainers usually employed are the low boiling aromatics such as benzene, toluene, xylene and the like, paraffinic hydrocarbons of suitable boiling points, e.g. heptene and octane or olefinic materials such as diisobutylene, etc. Various processes applicable to the manufacture of these plasticizer esters are known and this invention does not depend on any specific one. Also numerous acid and alcohol reactants are known and are amply set forth in the abundant prior art.

One of the primary difficulties encountered in the manufacture of plasticizer esters, especially where $C_8$ and $C_{10}$ alcohols are employed, is the failure to obtain colorless products even when relatively high purity reactants are employed. It has been known for some time that sulfur contaminants result in off-color ester products and more recently it was discovered that carbonyl compounds and carbonyl-forming compounds such as acetals affect to a marked degree the color of the final ester product. To counteract the discoloring effect, especially of carbonyls, on the ester most commercial esterification processes employ mild conditions and carefully control the reaction medium. Thus mild p-toluene sulfonic acid is employed in lieu of sulfuric acid and the reaction mixture is kept free of oxygen usually by blanketing the system with $CO_2$ or other inert gases. Para-toluene sulfonic acid is considerably more expensive than sulfuric acid and more sulfonic acid is necessary due to its lower order of activity. Therefore it would be a considerable advance in the art and a substantial savings in manufacturing cost if sulfuric acid could be employed with carbonyl contaminated alcohols and if the reaction could be run open to the atmosphere.

At present a principal source of alcohols for the manufacture of plasticizer esters is via the oxo or carbonylation route where an olefin is reacted with carbon monoxide and hydrogen in the presence of a catalyst, generally a cobalt salt, at elevated temperatures and pressures to form an aldehyde product having one more carbon atom than the starting olefin. This aldehyde product is then freed of cobalt and subsequently hydrogenated to form the corresponding alcohol products. While the sulfur contaminants introduced into the product by either the olefin or the hydrogenation catalyst, etc., may be cleaned up effectively by caustic washing, extensive distillation and similar treatments, the final alcohol product obtained in general will contain sufficient amounts of aldehyde and/or carbonyl-forming compounds such as acetals to seriously affect the ultimate color qualities of any ester prepared therefrom. Oxo alcohols will contain generally from 0.01 to 0.2 weight percent or higher of carbonyl or carbonyl-forming compounds. Dimer alcohols prepared by a modified oxo route are also valuable as intermediates in the preparation of esters and are subject to the same contamination problems as the ordinary oxo alcohols.

One potential commercial source of alcohols suitable for the preparation of plasticizers is via the alkyl metal route. This relatively new process comprises basically the addition of ethylene or other olefin onto a metal alkyl such as aluminum triethyl or aluminum triisobutyl to prepare high molecular weight aluminum trialkyl compounds which in turn may be oxidized to form the corresponding aluminum alcoholates and finally hydrolyzed to form the alcohol. The alcohols obtained via this new route also contain substantial quantities of carbonyl compounds which are either not separatable from the alcohol or separatable only with extensive costly treatment. Alternatively the alkyl metal may be made directly by reaction of olefin with metal and $H_2$. An alkyl metal of this type is easily converted to alcohols in the manner described above. This invention is limited to alcohols having carbonyl or carbonyl-forming contaminants regardless of the source.

It is therefore a primary object of this invention to treat those alcohols contaminated with carbonyl or carbonyl-forming compounds to permit the preparation of plasticizer esters having improved color properties. It is a further object of this invention to purify the alcohol sufficiently to permit the use of more severe esterification processes, including the use of sulfuric acid catalyst and atmospheric conditions.

Without unduly lengthening the present specification and for the purpose of defining with more particularity some of the alcohol sources, reference may be had to U.S. Patent No. 2,637,746 to Parker, which describes in detail the oxo process, and to a copending commonly assigned application, Serial No. 578,902, which describes one process for preparing alcohols via the alkyl metal route.

The particular stabilizing additives which fall within the scope of this invention are amide compounds containing two active hydrogen atoms attached to the nitrogen. These include primary amides such as the alkyl amides and primary amides containing an aromatic radical such as benzamide. Of particular interest are the primary lower alkyl acid amides containing from 0 to 6 carbon atoms in the alkyl radical such as formamide, acetamide, propionamide and the like. These preferred amides have the following structure:

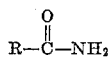

where R=hydrogen or a lower alkyl radical. Outstanding results have been obtained by the use of formamide. The amount of amide additive necessary, of course, will depend on the type and amount of contaminants in the alcohol treated. In general only small quantities in the range of 0.01 to 1.0 weight percent additive are necessary and from 0.05 to 0.6 is the preferred range. Care should be taken not to use excessive amounts of amides since when employed in high percentages, e.g. >1%, the amide inhibits or stops the catalytic reaction. The effect of the amide additive is realized after the alcohol has undergone some thermal treatment such as that required during the esterification. While preferably the amide is added to the alcohol prior to the esterification reaction a color inhibiting effect is achieved by adding the amide during the reaction. With regard to the acetals, these compounds probably break down during esterification in the presence of acid to form the carbonyl compounds which in turn are inactivated by the amide.

To demonstrate the effectiveness of formamide with regard to the color of plasticizer esters prepared from alcohols stabilized in accordance with this invention, carbonyl contaminated alcohols were employed in a severe esterification process designed to magnify any tendency toward discoloration due to contaminants which may be present in the alcohol. In the following table phthalic anhydride was reacted with the alcohol specified in a mole ratio of 1:2 at 130° C. and in the presence of 1 weight percent $H_2SO_4$ based on alcohol for 90 minutes. Since the discoloration of the ester was substantial as a result of the extremely severe conditions, the Gardner color scale was employed. In the Gardner color scale each unit is comparable to approximately 160 on the Hazen scale. The discoloration was due principally to the carbonyl contaminants in the alcohol reactant and magnified by the conditions employed:

TABLE I

*Ester quality improved by presence of formamide during reaction*

[Phthalate ester preparation, $H_2SO_4$ catalyst]

| Alcohol | Weight percent formamide/alcohol | Gardner (ester) color |
| --- | --- | --- |
| $C_{10}$ oxo | 0 | 4.0 |
| $C_{10}$ oxo | 0.1 | 1.0 |
| $C_8$ oxo | 0 | 1.25 |
| $C_8$ oxo | 0.03 | 1.0 |
| $C_8$ oxo | 0.13 | <1.0 |

When employing $C_{10}$ oxo alcohol without formamide an extremely high ester color was noted. As little as 0.1 weight percent of formamide on alcohol reduced the color from 4 to 1 on the Gardner scale. The $C_{10}$ alcohol contained 0.06% carbonyl. The $C_8$ oxo alcohol employed contained about 0.05% carbonyl, both as determined by carbonyl number. The addition of 0.13 weight percent formamide reduced the Gardner color of the ester derived from the $C_8$ oxo alcohol to less than 1. The Gardner scale does not go below 1.

Table I clearly shows that esters having a reduced color rating may be prepared even when employing alcohol reactants containing carbonyl contaminants under severe conditions including the use of concentrated sulfuric acid catalyst and allowing the reaction medium to be exposed to atmospheric conditions. This invention therefore permits the use of inexpensive processes not requiring special apparatus and as a major factor the employment of relatively inexpensive sulfuric acid in lieu of toluene or other sulfonic acids. It is to be understood, however, that the instant process is applicable insofar as the esterification is concerned to the use of any of the known esterification catalysts as well as to the employment of an inert atmosphere if desired.

To point out the singularity of the primary amides of this invention several tests were made under severe conditions employing for purposes of comparison similar nitrogen compounds including secondary amides such as acetanilide and imides containing only a single active hydrogen such as succinimide. The conditions employed for these tests were the same as those used for the tests in Table I.

TABLE II

*Primary amides improve ester color*

[$H_2SO_4$ catalyst; additives dissolved in $C_{10}$ alcohol (Oxo); temperature, 130° C.]

| Compound | Weight percent/alcohol | Ester color (Gardner) |
| --- | --- | --- |
| Control | | 3.8 |
| Formamide | 0.02 | 1.5 |
| | 0.10 | <1 |
| Acetamide | 0.153 | <1 |
| Benzamide | 0.3 | 1 |
| Acetanilide | 0.30 | 12 |
| Succinimide | a <0.21 | 2.5 |
| Triethylamine | 0.22 | 3.5 |
| Ethylamine | 0.1 | 2.5 |
| Urea | a <0.07 | 3.5 | a Not entirely soluble. Exact concentration not determined.

The above data show the unique stabilizing effect of the primary amides. It will be noted that all of the primary amides effected an ultimate ester color (Gardner) of 1 or less whereas the other compounds either had little or no effect on the color.

The esterification process to which this invention relates comprises the reaction of 2 to 2.5 moles of alcohol per mole of the desired dicarboxylic acid or anhydride in the presence of an acid catalyst such as p-toluene sulfonic acid, benzene sulfonic acid, sulfuric acid, and the like, at a temperature of about 100° to 200° C. for a period of 30 to 180 minutes. The reaction mixture may be blanketed under slight pressure by $CO_2$, $N_2$ or other inert gases to exclude oxygen. The amount of catalyst employed may vary in accordance with its activity. For example as little as 0.3 weight percent on alcohol, if sulfuric acid is the catalyst, while as much as 7.0 weight percent of toluene sulfonic acid may be employed.

Another major advantage of this process is that alcohols from any source which are contaminated with carbonyl or carbonyl-forming compounds in an amount which previously was prohibitive may now be employed to produce high quality esters where formerly due to carbonyl contaminants they were not suitable as reactants.

To illustrate the ultimate effect of formamide on the plastic in which the plasticizer is used, various controlled tests were made to determine the properties of plasticizers and plastics prepared therewith. It has been found that the formamide or in fact nitrogen compounds cannot be detected in the plasticizer and do not affect the qualities of the plastic, especially with regard to aging, tensile strength, elongation, volatility and the like.

In the tests shown in Table III the plasticizer was prepared by reacting 6% excess $C_{10}$ oxo alcohol containing 0.06 weight percent carbonyl as determined by carbonyl number with phthalic anhydride employing 0.6 weight percent of sulfuric acid based on theoretical ester. All conditions were the same with exception of the amount of formamide added.

TABLE III

| Run No | 1 | 2 | 3 | 4 |
|---|---|---|---|---|
| Percent formamide | 0 | 0.1 | 0.3 | 0.5 |
| Color of ester (Hazen)[1] | 65 | 45 | 35 | 10 |

[1] Ester product was distilled and treated with 0.05 weight percent carbon black.

The plasticizer of Run 4 was employed in polyvinyl chloride and compared to the plasticizer of Run 1 wherein no amide was employed.

TABLE IV

Formulation:
  Component—                      Parts by weight
  Polyvinyl chloride _____ 100
  Cadmium naphthenate ⎫ Conventional stabilizers for poly- ⎧ 2
  Barium ricinoleate     ⎭ vinyl chloride _____ ⎩ 1
  Plasticizer _____ 50

| | Plastic | |
|---|---|---|
| | Made with plasticizer of Run 1 in Table III | Made with plasticizer of Run 4 in Table III |
| Original: | | |
|   Tensile, p.s.i. | 2,320 | 2,400 |
|   100% modulus, p.s.i. | 1,500 | 1,400 |
|   200% modulus, p.s.i. | 2,080 | 2,000 |
|   300% modulus, p.s.i. | 2,320 | 2,300 |
|   Total elongation | 320 | 360 |
|   Color—Gardner | 1 | 1 |
| 7-day aging at 100° C. | | |
|   Tensile, p.s.i. | 2,250 | 2,200 |
|   100% modulus, p.s.i. | 1,820 | 1,850 |
|   200% modulus, p.s.i. | 2,200 | 2,000 |
|   Total elongation | 220 | 220 |
|   Volatility, percent | 5.7 | 5.8 |

The data above clearly indicate that the amide does not adversely affect the properties of the plastic. The minor numerical differences are largely within experimental error.

What is claimed is:

1. In a process of preparing esters suitable for use as plasticizers wherein one mole of an acidic compound selected from the group consisting of dicarboxylic acids and their anhydrides is reacted with at least two moles of an alcohol contaminated with a compound selected from the group consisting of a carbonyl, carbonyl-forming compounds and mixtures thereof, at elevated temperatures and in the presence of an acid catalyst, the improvement which comprises carrying out the reaction in the presence of a color inhibiting amount of a compound having the following formula:

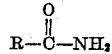

wherein R is a radical selected from the group consisting of hydrogen, lower alkyl and phenyl.

2. A process in accordance with claim 1 wherein said acid catalyst is sulfuric acid.

3. A process in accordance with claim 1 wherein said acid is a sulfonic acid.

4. A process of preparing esters suitable for use as plasticizers which comprises reacting one mole of an acidic compound selected from the group consisting of dicarboxylic acids and their anhydrides with at least two moles of an alcohol contaminated with a compound selected from the group consisting of a carbonyl, carbonyl-forming compounds and mixtures thereof, at elevated temperatures in the presence of a catalytic amount of sulfuric acid, carrying out said reaction open to the atmosphere and in the presence of a color-inhibiting amount of a compound having the following formula:

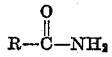

wherein R is a radical selected from the group consisting of hydrogen, lower alkyl and phenyl.

5. A process in accordance with claim 4 wherein said amide is formamide.

6. A process in accordance with claim 4 wherein said amide is acetamide.

7. A process in accordance with claim 4 wherein said amide is benzamide.

8. A process in accordance with claim 1 wherein said acidic compound is selected from the group consisting of phthalic acid, phthalic anhydride or mixtures thereof.

9. A process in accordance with claim 4 wherein said acidic compound is selected from the group consisting of phthalic acid, phthalic anhydride or mixtures thereof.

References Cited in the file of this patent

UNITED STATES PATENTS

| | | |
|---|---|---|
| 1,584,907 | Trusler | May 18, 1926 |
| 2,593,428 | Fischer et al. | Apr. 22, 1952 |
| 2,614,072 | Carlson et al. | Oct. 14, 1952 |
| 2,681,904 | Hyer et al. | June 22, 1954 |
| 2,713,075 | Doeringer | July 12, 1955 |